United States Patent Office 3,494,937
Patented Feb. 10, 1970

3,494,937
CERTAIN PHOSPHINOOXYPHTHALIDE COMPOUNDS
Graham O. Osborne, Christchurch, South Island, New Zealand, and Shirley B. Webb and Jack Wood, Sittingbourne, Kent, England, assignors to Shell Oil Company, New York, N.Y., a corporation of Delaware
No Drawing. Filed Sept. 26, 1966, Ser. No. 581,691
Claims priority, application Great Britain, Oct. 1, 1965, 41,722/65
Int. Cl. C07d 5/36; C07f 9/16; A01n 9/36
U.S. Cl. 260—343.3      8 Claims

ABSTRACT OF THE DISCLOSURE

Compounds of the formula:

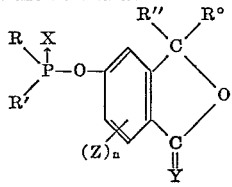

where R, R', R", R°, X, Z and n are as defined as hereinafter are useful as insecticides.

---

This invention relates to novel organophosphorus compounds, to insecticidal compositions containing them, and to the use of said compounds and compositions in combatting insect pests, and in protecting ornamental and crop plants from attack by insects.

The novel compounds of the invention can be represented by the general formula:

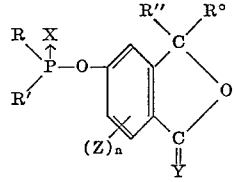

wherein R and R' each independently represents lower alkoxy, middle halogensubstituted lower alkoxy, lower alkenyloxy, amino ($NH_2$—), alkyl- or dialkyl-10 amino, lower alkoxyalkoxy and lower alkoxycarbonylalkoxy, each alkyl (or alkenyl) moiety preferably containing 1 to 4 carbon atoms; R" and R° each independently represents hydrogen, alkyl or (middle halo)alkyl, preferably containing from 1 to 4 carbon atoms, or R" and R° together can represent lower alkylidene, preferably which contains from 1 to 4 carbon atoms, and which may be substituted by middle halogen; X represents oxygen or sulfur; Y represents oxygen or sulfur; Z represents alkoxy of from 1 to 4 carbon atoms or middle halogen; n is zero, 1, 2 or 3.

Alkyl and/or alkenyl moieties involved in the structure may be branched-chain or straight-chain in configuration. By middle halogen is meant bromine or chlorine. When R" and R° together represent an alkylidene group (R" and R° each being one of and together constituting the olefinic double bond to the indicated ring carbon atom), preferably the alkylidene group is methylene, and if substituted by halogen preferably is dichloromethylene.

Preferred compounds of the invention are those in which R" and R° each is hydrogen, methyl or together form the dichloromethylene group, R and/or R' each is methoxy, ethoxy, isopropoxy, dimethylamino, allyloxy methoxyethoxy, ethoxycarbonylmethoxy, n is 0, 1 or 2 and Z is chlorine, bromine or methoxy.

Most preferred are the compounds of this subclass wherein R and R' each is unsubstituted alkoxy of 1 to 3 carbon atoms, R" and R° each is hydrogen, X is sulfur, Y is oxygen or sulfur and n is zero.

The compounds 5-dimethoxyphosphinothioyloxyphthalide, 5-dimethoxyphosphinothioyloxy-1-thiophthalide, 5-diethoxyphosphinothioyloxy-1-thiophthalide, and 5-[methoxy - (2 - methoxyethoxy)phosphinothioyloxy]phthalide are particularly effective as insecticides and accordingly are preferred compounds of the invention.

The phthalides of the invention may be prepared by a process which comprises reacting under basic conditions a phenol of the following general formula:

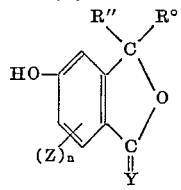

or an alkali metal salt thereof, with a halide of the following general formula:

where R, R', R", R°, X, Y, Z and n have the meanings aforesaid and hal represents a middle halogen atom. The basic conditions for the reaction may be produced where necessary by the addition of a base. When a base is added it may be a nitrogenous base, e.g. trimethylamine or preferably an alkali or alkaline earth metal carbonate, e.g. sodium or potassium carbonate.

The reaction is preferably carried out in an inert liquid reaction medium, which may be a solvent for the reactants or for the products of the reaction, or both. Inert reaction media such as acetone and methyl isobutyl ketone are esecially suitable for this purpose; other reaction media such as benzene, diethyl ether, chloroform and tetrahydrofuran are suitable.

The reaction may be carried out at a temperature in the range 0–150° C., preferably between 50° C. and 100° C.

The hydroxyphthalides, used as starting materials in the above process, may be prepared according to methods disclosed in J.C.S., 867–871 (1931); Bull. Soc. Sci. Bretagne, 26, 7–122 (1951) and J. Ind. Chem. Soc., 40, 239–240, 1963. The hydroxythiophthalides may be prepared by the action of phosphorus pentasulfides on an acetoxyphthalide with subsequent hydrolysis to give the sodium salt of the hydroxyl-1-thiophthalide. Phosphorylation may then be carried out without isolation of the intermediate hydroxythiophthalide.

The compounds of the invention, their preparation and their insecticidal activity are further illustrated in the Examples that follow in which parts by weight (w.) and parts by volume (v.) bear the same relation as the kilogram to the litre.

EXAMPLE I

Preparation of 5-dimethoxyphosphinothioyloxyphthalide

A mixture of 5-hydroxyphthalide (1.5 w.), dimethylphosphorochloridothionate (1.6 w.) and anhydrous potassium carbonate (0.86 w.), was heated under reflux with dry methyl isobutyl ketone (75 v.) for 5 hours. After cooling the reaction mixture was filtered and the solvent was evaporated under reduced pressure. The liquid residue was taken up in methylene chloride, washed with cold aqueous (0.2 N) sodium hydroxide solution (25 v.) followed by cold water and dried over anhydrous magnesium sulfate. After filtration, the solvent was removed under reduced pressure. Recrystallization from hexane gave colorless crystals of 5-dimethoxyphosphinothioyloxyphthalide. M.P. 59.5–61.5° C. Yield 63%.

Analysis (percent by weight).—Found: C, 43.6; H, 4.0; S, 11.8; P, 11.0. $C_{10}H_{11}PSO_5$ requires: C, 43.8; H, 4.0; S, 11.7; P, 11.3.

EXAMPLE II

Preparation of 4-bromo-5-dimethoxyphosphinothioyloxyphthalide

This compound was prepared by the method described in Example I. 4-bromo-5-hydroxyphthalide and dimethyl phosphorochloridothionate were used as starting materials. The product obtained was 4-bromo-5-dimethoxyphosphinothioyloxyphthalide. M.P. 77–79° C. Yield 44%.

Analysis (percent by weight).—Found: C, 34.0; H, 3.1; P, 8.5; Br, 23.0. $C_{10}H_{10}PSO_5Br$ requires: C, 34.0; H, 2.8; P, 8.8; Br, 22.7.

EXAMPLE III

Preparation of 5-dimethoxyphosphinothioyloxy-1-thiophthalide

A solution of 1% sodium ethoxide in ethanol (11.5 v.) was added to a cold solution of 5-acetoxy-1-thiophthalide (1.04 w.) in absolute alcohol (65 v.). The sodium salt of 5-hydroxy-1-thiophthalide was obtained by removing the solvent under reduced pressure at a temperature not exceeding 40° C. This product was taken up in acetone and refluxed for 15 minutes with O,O-dimethyl phosphorochloridothionate (0.8 w.). After cooling, the mixture was filtered and the solvent was removed by evaporation under reduced pressure.

The product, 5-dimethoxyphosphinothioyloxy-1-thiophthalide was purified by column chromatography using methylene chloride and silica gel. M.P. 39-40.5° C. Yield 57%.

Analysis (percent by weight).—Found: C, 41.5; H, 3.9; P, 10.5; S, 22.2. $C_{10}H_{11}PS_2O_4$ requires: C, 41.4; H, 3.8; P, 10.7; S, 22.05.

EXAMPLE IV

Preparation of 5-[methoxy(dimethylamino)phosphinothioyloxy]phthalide

A solution of the sodium salt of 5-hydroxyphthalide was prepared by dissolving metallic sodium (0.75 w.) in dry methanol (100 v.) and adding 5-hydroxyphthalide (5 w.). The solvent was removed from this solution under reduced pressure and the residue so obtained dissolved in a mixture of methyl isobutyl ketone (150 v.) and dry ethanol (25 v.). The resulting solution was heated with methyl (dimethylamino)phosphorochloridothionate (5.5 w.) at 95° C. for 6 hours.

After cooling the solvent was removed under reduced pressure, the residue taken up in ether, the ether solution washed with water, dried and the solvent again removed under reduced pressure. The residue so obtained was triturated with a mixture of chloroform/carbon tetrachloride (1:1). Evaporation of the solvent mixture resulted in an oil which crystallized on standing. Further crystallization from aqueous alcohol (1:1) gave 5-[methoxy-(dimethylamino)phosphinothioyl]thiophthalide, M.P. 58–61° C.

Analysis (percent by weight).—Found: C, 46.3; H, 5.0; N, 4.7. $C_{11}H_{14}O_4PSN$ requires: C, 46.0; H, 4.9; N, 4.9.

EXAMPLE V

The compounds shown in Table 1 were prepared in a manner analogous to that described in Examples I–IV.

EXAMPLE VI

This example illustrates the preparation of an emulsifiable concentrate formulation containing a compound of the present invention as active ingredient.

The components were dissolved in the proportions shown and the solution blended and filtered.

|  | W. |
|---|---|
| 5-dimethoxyphosphinothioyloxy-1-thiophthalide | 30 |
| Tensiofix AS | 1 |
| Tensiofix NS | 9 |
| Shellsol A to 100 v. | |

(where Tensiofix AS and Tensiofix NS are both mixed blends, but in different proportions, of polyethylene oxide condensates and anionic alkyl sulfonates and Shellsol A is a mixture of trimethylbenzenes).

EXAMPLE VII

Insecticidal activity of the organophosphorus phthalide derivatives

A 0.1% by weight solution in acetone of the compound was prepared and taken up in a micrometer syringe. Adult female house flies (*Musca domestica*) were anaesthetized with carbon dioxide and 1 microliter of the solution applied to the ventral abdomen of each fly. The treated flies were then placed in glass jars, each containing a small quantity of sugar as food for the flies. Twenty-four hours later the number of dead and moribund flies was recorded.

TABLE 1

| Compound | Melting point, °C. | Analysis (percent by weight) |
|---|---|---|
| 6-dimethoxyphosphinothioyloxy phthalide WL13375 | 101.5–103 | Found: C, 44.0; H, 4.0; S, 12.0; P, 11.2. Calculated: C, 43.8; H, 4.0; S, 11.8; P, 11.3. |
| 4-dimethoxyphosphinothioyloxy phthalide WL17470 | 86–88 | Found: C, 44.0; H, 4.0; P, 11.2; S, 11.9. Calculated: C, 43.8; H, 4.0; P, 11.3; S, 11.7. |
| 7-dimethoxyphosphinothioyloxy phthalide WL17617 | 61.5–63 | Found: C, 43.7; H, 3.9; P, 11.3; S, 11.8. Calculated: C, 43.8; H, 4.0; P, 11.3; S, 11.7. |
| 4-diethoxyphosphinothioyloxy phthalide WL17522 | 36–38 | Found: C, 47.4; H, 5.2; P, 10.2; S, 10.7. Calculated: C, 47.6; H, 5.0; P, 10.3; S, 10.6. |
| 5-diethoxyphosphinothioyloxy phthalide in Table | 38.5–40.5 | Found: P, 10.2. Calculated: P, 10.3. |
| 5-diethoxyphosphinothioyloxy-1-thiophthalide in Table | 66.5–68 | Found: C, 45.2; H, 5.0; P, 9.7; S, 20.1. Calculated: C, 45.3; H, 4.7; P, 9.8; S, 20.2. |
| 5-dimethoxyphosphinothioyloxy-6-methoxyphthalide WL17523 | 119–122 | Found: C, 43.5; H, 4.3; P, 10.2; S, 10.7. Calculated: C, 43.4; H, 4.3; P, 10.2; S, 10.5. |
| 3-dichloromethylene-6-dimethoxyphosphinothioyloxy phthalide | 61–63 | Found: C, 38.9; H, 2.6; Cl, 21.4; P, 6.9. Calculated: C, 37.2; H, 2.5; Cl, 20.0; P, 8.7. |
| 4-chloro-5-(diethoxyphosphinyloxy)-6-methoxyphthalide | 121.5–123.5 | Found: P, 9.0; Cl, 10.5. Calculated: P, 8.8; Cl, 10.2. |
| 3-methyl-4-(dimethoxyphosphinothioyloxy) phthalide | (1) | Found: C, 46.1; H, 4.2; P, 10.6; S, 11.0. Calculated: C, 45.9; H, 4.5; P, 10.8; S, 11.1. |
| 5-[methoxy(ethoxy)phosphinothioyloxy]phthalide | (2) | Found: C, 45.6; H, 4.7; P, 10.7; S, 11.1. Calculated: C, 45.9; H, 4.5; P, 10.8; S, 11.1. |
| 5-[methoxy(ethoxy)phosphinothioyloxy] 1-thiophthalide | (3) | Found: C, 43.7; H, 4.5; P, 10.2; S, 21.2. Calculated: C, 43.4; H, 4.3; P, 10.2; S, 21.1. |
| 5-[methoxy(isopropyloxy)phosphinothioyloxy]phthalide | 78–81 | Found: C, 47.7; H, 5.1; S, 10.4. Calculated: C, 47.7; H, 5.0; S, 10.6. |
| 5-(diisopropoxyphosphinothioyloxy)-1-thiophthalide | 93–04.5 | Found: C, 51.1; H, 5.5; P, 9.1; S, 18.0. Calculated: C, 48.5; H, 5.5; P, 9.4; S, 18.5. |
| 5-[methoxy-(2-methoxyethoxy)phosphinothioyloxy]phthalide | (1) | Found: C, 45.2; H, 4.6; P, 9.9; S, 10.2. Calculated: C, 45.3; H, 4.7; P, 9.8; S, 10.1. |
| 5-[methoxy(allyloxy)phosphinothioyloxy]phthalide | (1) | Found: C, 48.3; H, 4.6; P, 10.2; S, 10.6. Calculated: C, 48.0; H, 4.3; P, 10.3; S, 10.7. |
| 5-[methoxy(ethoxycarbonylmethoxy)phosphinothioyloxy]phthalide | (3) | Found: C, 45.0; H, 4.2; S, 9.2. Calculated: C, 45.0; H, 4.4; S, 9.3. |

1 Colorless oil.
2 Pale yellow oil.
3 Yellow oil.

In addition to *Musca domestica*, five other species were included in the test. These are *Aedes aegypti* (mosquito larvae), *Phaedon cochleariae* (mustard beetles), *Plutella maculipennis* (diamond-back moth larvae), *Acyrthosiphon pisum* (pea aphids) and *Tetranychus telarius* (red spider mites). The tests comprised exposure to aqueous dispersions for mosquito larvae and exposure to sprayed foliage for mustard beetles, diamond-back moth larvae, pea aphids and red spider mites.

The results of the above tests are summarized in Table 2, where A denotes 100% kill, B some kill and C no kill of the test insects.

sulfonic acids containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate.

The compositions of the invention may be formulated as wettable powders, dusts, granules, solutions, emulsifiable concentrates and emulsions.

The compositions of the invention may contain other ingredients, for example, protective colloids such as gelatin, glue, casein, gums and polyvinyl alcohol; sodium polyphosphates; cellulose ethers; stabilizers such as ethylene

TABLE 2

| Compound | Musca domestica | Aedes aegypti | Phaedon cochleariae | Plutella maculipennis | Acyrthosiphon pisum | Tetranychus telarius |
|---|---|---|---|---|---|---|
| 5-dimethoxyphosphinothioyloxyphthalide | A | A | A | A | A | B |
| 5-dimethoxyphosphinothioyloxy-1-thiophthalide | A | A | A | A | A | B |
| 5-diethoxyphosphinothioyloxyphthalide | A | C | A | A | A | C |
| 4-bromo-5-dimethoxyphosphinothioyloxy-phthalide | B | B | A | A | A | C |
| 5-diethoxyphosphinothioyloxy-1-thiophthalide | A | A | A | A | A | A |
| 5-[methoxy(ethoxy)phosphinothioyloxy]-1-thiophthalide | A | A | A | A | A | A |
| 5-[methoxy(ethoxy)phosphinothioyloxy]phthalide | A | A | A | A | A | A |
| 5-[methoxy-(2-methoxyethoxy)phosphinothioyloxy]phthalide | C | A | A | A | A | A |

The compounds of the invention may be used in the manner known for organophosphorus insecticides, that is to say, they may be applied in admixture with an inert diluent or with both an inert diluent and a surface active agent. The invention therefore includes insecticidal compositions which comprise compounds of the invention together with a carrier, or a surface active agent, or both a carrier and a surface active agent.

The term "carrier" as used herein means a material, which may be inorganic or organic and of synthetic or natural origin, with which the active compound is mixed or formulated to facilitate its application to the plant, seed, soil or other object to be treated or its storage, transport or handling. The carrier may be a solid or a fluid. Any of the materials usually applied in formulating herbicides or insecticides may be used as carrier.

Examples of suitable solid carriers are silicates, clays, for example kaolinite clay, synthetic hydrated silicon oxides, synthetic calcium silicates, elements such as for example, carbon and sulfur, natural and synthetic resins such as for example, coumarone resins, rosin, copal, shellac, dammar, polyvinyl chloride and styrene polymers and copolymers, solid polychlorophenols, bitumen, asphaltite, waxes such as for example, beeswax, paraffin wax, montan wax and chlorinated mineral waxes, and solid fertilizers, for example superphosphates.

Examples of suitable fluid carriers are water, alcohols, such as for example, isopropanol, ketones such as for example, acetone, methyl ethyl ketone, methyl isobutyl ketone and cyclohexanone, ethers, aromatic hydrocarbons such as for example, benzene and toluene, petroleum fractions such as for example, kerosine, chlorinated hydrocarbons, such as for example, carbon tetrachloride, including liquified normally vaporous or gaseous organic compounds. Mixtures of different liquids are often suitable.

The surface active agent may be a wetting agent, an emulsifying agent or a dispersing agent; it may be nonionic or ionic. Any of the surface active agents usually applied in formulating herbicides or insecticides may be used. Examples of suitable surface active agents are the sodium or calcium salts of polyacrylic acids, the condensation products of fatty acids or aliphatic amines or amides containing at least 12 carbon atoms in the molecule with ethylene oxide and/or propylene oxide; partial esters of the above fatty acids with glycerol, sorbitan, sucrose or pentaerythritol; condensation products of alkyl phenols, for example p-octylphenol or p-octylcresol, with ethylene oxide and/or propylene oxide; sulfates or sulfonates of these condensation products; and alkali metal salts, preferably sodium salts, or sulfuric acid esters or diamine tetra-acetic acid; other herbicides or pesticides; and stickers, for example non-volatile oils.

Aqueous dispersions and emulsions, for example, compositions obtained by diluting a wettable powder or an emulsifiable concentrate according to the invention with water also lie within the scope of the present invention. The said emulsions may be of the water-in-oil or of the oil-in-water type, and may have a thick, "mayonnaise"-like consistency.

Other typical species of the compounds of the invention include:

5-[ethoxy (methylamino)phosphinothioyloxy] - 1 - thiophthalide;

5-[methoxy (amino)phosphinothioyloxy] phthalide;

5 - [ethoxy (methylamino)phosphinothioyloxy] - 1 - thiophthalide;

5-[di(2-chloroethoxy)phosphinothioyloxy] phthalide;

5 - [tetramethyldiaminophosphinothioyloxy]-1-thiophthalide.

We claim as our invention:
1. A phosphorus ester of the formula

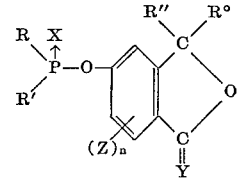

wherein R and R' each independently represents a member of the group consisting of alkoxy, bromo-substituted alkoxy and chloro-substituted alkoxy, alkenyloxy, amino, alkylamino, dialkylamino, alkoxyalkoxy and alkoxycarbonylalkoxy, in which each alkyl, alkoxy, and alkenyl moiety contains from one to four carbons, R" and R° each independently represents a member of the group consisting of hydrogen, alkyl, bromo-substituted alkyl and chloro-substituted alkyl wherein each alkyl group contains from one to four carbon atoms, with the proviso that R" and R° together can represent a member of the group consisting of alkylidene bromo-substituted alkylidene and chloro-substituted alkylidene wherein each alkylidene group contains from one to four carbon atoms, X and Y each independently represents a member of the group consisting of sulfur and oxygen, Z represents a member of the group consisting of alkoxy of from 1 to 4 carbon atoms, chlorine and bromine, and $n$ is a whole number from zero to three.

2. A phosphorus ester according to claim 1 wherein R and R' each is unsubstituted alkoxy of from 1 to 3 carbon atoms, R″ and R° each is hydrogen, X and Y each is sulfur, and $n$ is zero.

3. A phosphorus ester according to claim 1 wherein R and R′ each is unsubstituted alkoxy of from 1 to 3 carbon atoms, R″ and R° each is hydrogen, X is sulfur, Y is oxygen and $n$ is zero.

4. A phosphorus ester according to claim 2 wherein R and R′ each is ethoxy.

5. A phosphorus ester according to claim 2 wherein R is methoxy and R′ is ethoxy.

6. A phosphorus ester according to claim 3 wherein R is methoxy and R′ is ethoxy.

7. A phosphorus ester according to claim 2 wherein R and R′ each is methoxy.

8. A phosphorus ester according to claim 3 wherein R and R′ each is methoxy.

References Cited

FOREIGN PATENTS 1,086,048  10/1967  Great Britain.

ALEX MAZEL, Primary Examiner

ANNE MARIE T. TIGHE, Assistant Examiner

U.S. Cl. X.R.

424—203